Feb. 27, 1962 | J. M. THORSÉN | 3,023,355

AMPLITUDE LIMITING SYSTEM

Filed May 2, 1956

INVENTOR
JARL MORANNAR THORSÉN
BY Kane and Nydick
ATTORNEYS

United States Patent Office 3,023,355
Patented Feb. 27, 1962

3,023,355
AMPLITUDE LIMITING SYSTEM

Jarl Morannar Thorsen, Hagersten, Sweden, assignor to Telefonaktiebolaget L M Ericsson, Stockholm, Sweden, a corporation of Sweden Filed May 2, 1956, Ser. No. 582,262
Claims priority, application Sweden May 17, 1955
8 Claims. (Cl. 323—9)

The present invention relates to a device for equal limiting of the positive and negative amplitudes of a signal and particularly to an improvement of previously known devices.

In such devices the signal path is usually shunted with two separate connecting branches for limiting the positive and negative parts of the signal, each such connecting branch comprising a D.C. source and a rectifier element. The limiting level of the signal amplitude will be determined by the potential of the D.C. source, and in order to obtain an equal limiting of the positive and negative amplitudes, the potential of the voltage sources in the two connecting branches must be kept on exactly the same level. This, however, is difficult in practice, and the broad object of the present invention is to provide a system to avoid said difficulties.

Thus, the device according to the invention is characterized by a two-terminal network shunting the signal path and comprising two parallel paths, each one consisting of a diode in series with an impedance element with a low impedance for signal frequencies, the corresponding electrodes in the diodes being each of them connected to one of the terminals of the two-terminal network, while the other electrodes of the diodes, which are connected to the respective impedance elements, are connected to each other over a second impedance element, the impedance of which is low for D.C. current but high for signal frequencies, and a common bias source connected between a point with a fixed potential and a point on said second impedance element.

As a result, the present invention has the advantage in comparison with previously known devices, that one and the same bias source determines the limiting of the positive signal voltage amplitudes as well as of the negative ones, said amplitudes, thus, being limited to exactly the same mutual value independent upon the potential of the bias source.

Figure 1:
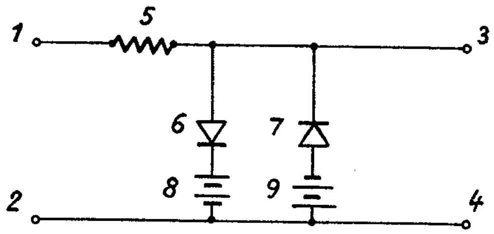
Fig. 1 PRIOR ART

The invention will now be described in detail in connection with the attached drawing, in which FIG. 1 shows a previously known device and FIGS. 2 and 3 two different embodiments according to the invention.

In FIG. 1 the input terminals of the device are designated by 1 and 2 and the output terminals by 3 and 4. A resistance 5 is connected between the terminals 1 and 3, and the output terminals are shunted with two separate branches each of them containing a diode 6 and 7, respectively, and a bias source 8 and 9, respectively, the polarity of said bias sources being such that the diodes are normally non-conductive. Thus, the two-terminal network 6–9, which shunts the output terminals, normally has a very high resistance. The positive amplitudes of the signal voltage will then be limited by the shunt branch 6, 8 to a level which is determined by the voltage of the battery 8, and the negative amplitudes will be limited by the shunt branch 7, 9 to a level which is determined by the voltage of the battery 9. In order to obtain such a device exactly the same limitations of the positive and the negative amplitudes of a signal it is necessary that the voltage over the bias sources 7 and 9, respectively, is exactly equal, and this, as mentioned before, is difficult to achieve in practice.

Figure 2:
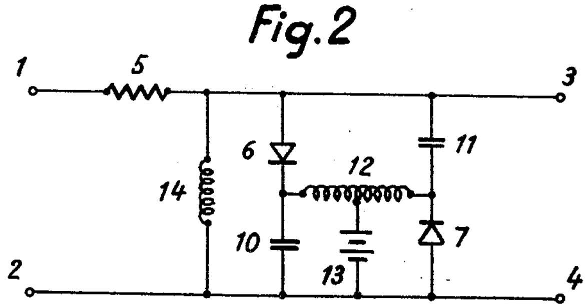

FIG. 2 shows an embodiment according to the invention, the input- and output terminals, respectively, of the device being designated by 1, 2 and 3, 4, respectively. A resistance 5 is interconnected between the terminals 1 and 3 and may for instance consist of the inner resistance of a generator. The output terminals are shunted by a diode 6 in series with a condenser 10 as well as by a diode 8 in series with a condenser 11. The anodes of the diodes are connected to the respective output terminals, and the cathodes are connected together over a coil 12. A point on the coil, preferably the center tap, is connected to the positive terminal of a bias source 13, the negative terminal of which is connected to a point with a fixed potential, for instance ground. The output terminals are also shunted by an impedance 14, preferably a coil. The coils 12 and 14 will have a high impedance for signal frequencies and the condensers 10 and 11 a low impedance for such frequencies.

In a device according to the one described above the two diodes will, thus, have exactly the same bias voltage. The signal voltages will be limited to an amplitude which is determined by the voltage of the bias source 13, so that the output terminals of the device are short circuited for positive signal amplitudes by means of the diode 6 and the condenser 10 and for negative signal amplitudes by means of the diode 7 and the condenser 11. The limiting level is, however, not only determined by the bias source 13, but the rectifier voltage which arises through the diodes over the condensers 10 and 11, respectively, will also have an effect thereon. The capacitance of the condensers should therefore be so high that the influence on the limiting level will be as small as possible, and for similar reasons the coil 12 should have a low D.C. resistance. The coil 14, the D.C. resistance of which also should be low, serves to complete a circuit for the D.C. current through the diode 6.

Figure 3:
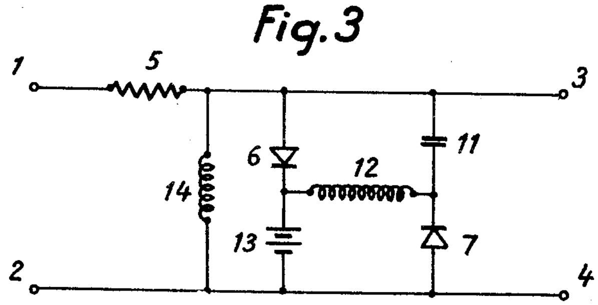

FIG. 3 shows a somewhat simplified embodiment of the device according to FIG. 2 and is different from this only by the fact that the condenser 10 is omitted and the bias source 13 has been connected between the cathode of the diode 6 and the terminal 2. The cathodes of the two diodes are, as before, connected together by a coil 12, and the inner resistance of the voltage source 13 should in this system also be low, as well as in the device according to FIG. 2. The device according to FIG. 3 is evidently constructed somewhat simpler than the device according to FIG. 2 and may, with advantage, be used when a quite symmetric connection is not necessary.

The invenion is of course not limited to the embodiments shown on the drawing but it may be varied as to its details within the scope of the invention.

I claim:

1. A device for equal limiting of the positive and negative amplitudes of a signal, comprising a two-terminal network shunting the signal path and consisting of two parallel branches, wherein each branch contains a diode in series with an element having an impedance low for signal frequencies, the corresponding electrodes in the diodes being, each of them, connected to one of the terminals of the two-terminal network, while the other electrodes of the diodes which are connected to the respective elements are connected to each other through an impedance element, having an impedance low for D.C. current but high for signal frequencies, and a bias source of constant potential common to both branches and connected between a point of a fixed potential and a point on said impedance element.

2. A circuit system for limiting at an equal level the positive and negative amplitudes of signal freqencies over a two-wire signal path, said system comprising a two-terminal network means shunting said signal path, said network means having two parallel branches, each including connected in series a diode and an impedance means of a low impedance for signal frequencies, each of the like electrodes of the diodes being directly connected to a respective one of the output terminals of the network means, the other electrodes of the diodes being connected to the impedance means in the respective branch, an impedance means of low impedance for direct current but of high impedance for signal frequencies interconnected between said other electrodes, and a bias source of direct current and constant potential common to both branches and connected between said last mentioned impedance means and a point of fixed potential.

3. A circuit system for limiting at an equal level the positive and negative amplitudes of signal frequencies over a two-wire signal path, said system comprising a two-terminal network shunting said signal path, said network having two parallel branches each including connected in series a diode and an impedance means of low impedance for signal frequencies, said diodes being connected in opposition, an impedance means of high impedance for signal frequencies interconnecting said two branches at the junction point between the respective diode and the respective impedance means, and a bias source of direct current and constant potential common to both branches and connected between said impedance means of high impedance and a point of fixed potential.

4. A circuit system according to claim 3 and also comprising a further impedance means of high impedance for signal frequencies shunting the output terminals of said network.

5. A circuit system according to claim 4 wherein said impedance means connecting the two branches and said further impedance means have a low direct current resistance.

6. A circuit system according to claim 4 wherein said impedance means included in said two branches in series connection are capacitance means.

7. A circuit system according to claim 3 wherein said impedance means connecting said two branches is a coil impedance.

8. A circuit system according to claim 3 wherein said bias source is connected to a center tap of the impedance means connecting said branches.

References Cited in the file of this patent

UNITED STATES PATENTS

| | | |
|---|---|---|
| 1,951,148 | Grinsted | Mar. 13, 1934 |
| 2,122,748 | Mayer | July 5, 1938 |
| 2,173,925 | Tuxen | Sept. 26, 1939 |
| 2,259,532 | Nicholson | Oct. 21, 1941 |
| 2,285,044 | Morris | June 2, 1942 |
| 2,342,238 | Barney | Feb. 22, 1944 |